United States Patent
Kim et al.

(10) Patent No.: US 9,778,780 B2
(45) Date of Patent: *Oct. 3, 2017

(54) METHOD FOR PROVIDING USER INTERFACE USING MULTI-POINT TOUCH AND APPARATUS FOR SAME

(71) Applicant: KOREA ELECTRONICS TECHNOLOGY INSTITUTE, Seongnam-si, Gyeonggi-do (KR)

(72) Inventors: Kunnyun Kim, Yongin-si (KR); Wonhyo Kim, Yongin-si (KR); Yeonhwa Kwak, Seoul (KR); Kwangbum Park, Yongin-si (KR)

(73) Assignee: KOREA ELECTRONICS TECHNOLOGY INSTITUTE, Seongnam-si, Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/655,242

(22) PCT Filed: Dec. 24, 2013

(86) PCT No.: PCT/KR2013/012137
§ 371 (c)(1),
(2) Date: Jun. 24, 2015

(87) PCT Pub. No.: WO2014/104727
PCT Pub. Date: Jul. 3, 2014

(65) Prior Publication Data
US 2016/0162098 A1 Jun. 9, 2016

(30) Foreign Application Priority Data

Dec. 26, 2012 (KR) .................. 10-2012-0152887
Dec. 26, 2012 (KR) .................. 10-2012-0152888

(51) Int. Cl.
G06F 3/041 (2006.01)
G06F 3/048 (2013.01)
(Continued)

(52) U.S. Cl.
CPC ............ G06F 3/0416 (2013.01); G06F 3/041 (2013.01); G06F 3/048 (2013.01); G06F 3/0412 (2013.01);
(Continued)

(58) Field of Classification Search
CPC ...... G06F 3/016; G06F 3/0488; G06F 3/0414; G06F 3/03547; G06F 3/003543;
(Continued)

(56) References Cited

U.S. PATENT DOCUMENTS 6,304,840 B1 * 10/2001 Vance .................. G06F 3/014
341/20
8,239,784 B2 * 8/2012 Hotelling .............. G06F 3/0418
345/173

(Continued)

FOREIGN PATENT DOCUMENTS

KR 1020100076921 A 7/2010
KR 1020100105545 A 9/2010
(Continued)

OTHER PUBLICATIONS

International Search Report for PCT/KR2013/012137 mailed on Mar. 31, 2014.
(Continued)

Primary Examiner — Sanjiv D Patel
(74) Attorney, Agent, or Firm — Hauptman Ham, LLP

(57) ABSTRACT

The present invention relates to a method for providing a user interface using a multi-point touch capable of immediately carrying out various user commands by changing the direction of force applied to two or more different points (Continued)

inside a touch area, and to an apparatus for same, wherein when contact on two or more different points inside the touch area is sensed, directions of force applied to the two or more points are detected while the contact to the two or more points is maintained when the contact on the two or more points is detected, and a predetermined user command is carried out according to a combination of the directions of force detected from the points.

14 Claims, 11 Drawing Sheets

(51) Int. Cl.
*G06F 3/0484* (2013.01)
*G06F 3/0488* (2013.01)

(52) U.S. Cl.
CPC ........ *G06F 3/0414* (2013.01); *G06F 3/04845* (2013.01); *G06F 3/04883* (2013.01); *G06F 2203/04104* (2013.01); *G06F 2203/04806* (2013.01); *G06F 2203/04808* (2013.01)

(58) Field of Classification Search
CPC ...... G06F 3/041; G06F 1/13338; G06F 3/011; G06F 3/0416; G06F 3/04883; G06F 3/04815; G06F 2203/04808; G06F 17/30864; G06F 3/0484; G06F 3/017; G06F 3/0304; G06F 3/03543; G06F 3/048
See application file for complete search history.

(56) References Cited

U.S. PATENT DOCUMENTS

| 9,244,562 | B1* | 1/2016 | Rosenberg ........... G06F 3/04847 |
| 2007/0252821 | A1* | 11/2007 | Hollemans ............ G06F 3/0416 345/173 |
| 2009/0066670 | A1 | 3/2009 | Hotelling et al. |
| 2010/0020025 | A1* | 1/2010 | Lemort ............... G06F 3/04883 345/173 |
| 2010/0090973 | A1* | 4/2010 | Algreatly .............. G06F 3/0414 345/173 |
| 2011/0063241 | A1 | 3/2011 | Oh |
| 2013/0100016 | A1* | 4/2013 | Onodera ............... G06F 3/0338 345/157 |
| 2013/0181726 | A1* | 7/2013 | Viallet .................... G01L 1/146 324/652 |
| 2014/0176485 | A1* | 6/2014 | Holmberg .............. G06F 3/041 345/174 |

FOREIGN PATENT DOCUMENTS

| KR | 1020110086501 A | 7/2011 |
| KR | 1020110086502 A | 7/2011 |
| KR | 1020120051872 A | 5/2012 |

OTHER PUBLICATIONS

Office Action issued for corresponding Korean Application No. 10-2012-0152887 mailed on Dec. 31, 2013.
Notice of Allowance issued for corresponding Korean Application No. 10-2012-0152887 mailed on Aug. 25, 2014.

* cited by examiner

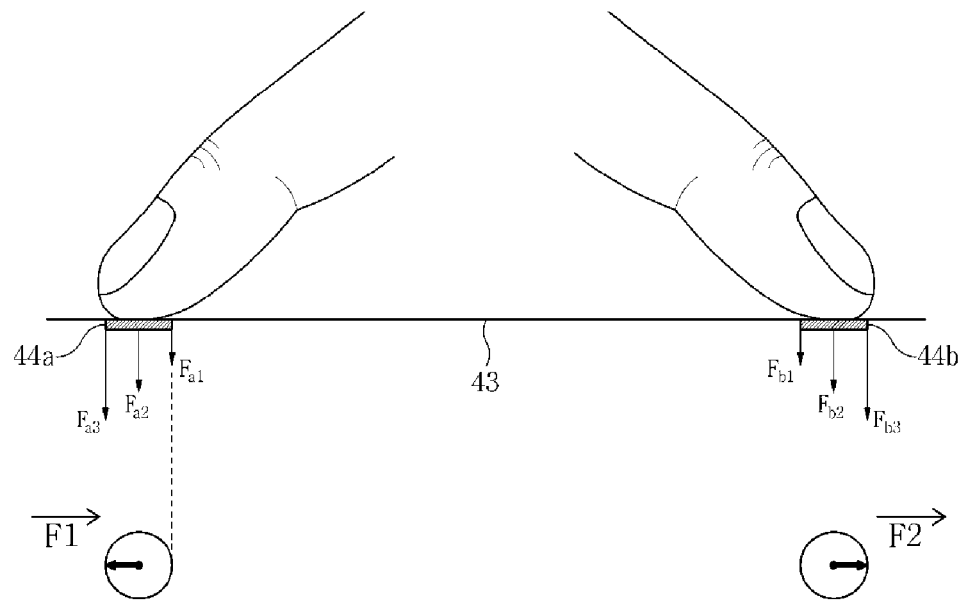

FIG. 12

| | Combination Pattern | User Command |
|---|---|---|
| ① | | Left Rotation |
| ② | | Right Rotation |
| ③ | | Backward Push |
| ④ | | Forward Pull |
| ⑤ | | Zooming-Out |
| ⑥ | | Zooming-In |

METHOD FOR PROVIDING USER INTERFACE USING MULTI-POINT TOUCH AND APPARATUS FOR SAME

CROSS REFERENCE TO RELATED APPLICATIONS

This application claims the priority of Korean Patent Application No. 10-2012-0152887 filed on Dec. 26, 2012 in the Korean Intellectual Property Office and Korean Patent Application No. 10-2012-0152888 filed on Dec. 26, 2012 in the Korean Intellectual Property Office. Further, this application is the National Phase application of International Application No. PCT/KR2013/012137 filed on Dec. 24, 2013, which is incorporated herein by reference in its entirety.

TECHNICAL FIELD

The present invention relates to a touch-type user interface, and more particularly, to a method and apparatus for providing a user interface using a multi-point touch in which a user may execute various user commands with a one touch operation for two or more points without needing to perform a complex touch gesture such as tapping, dragging, sliding, or pinching or draw a predetermined pattern.

BACKGROUND ART

These days, there are many types of input devices such as a key pad including multiple buttons or keys, a mouse, a track ball, a touch pad, a joystick, a touch screen, or the like in order to manipulate a computer system. Such input devices are used to input data such as a letter, a symbol, a picture, or the like desired by users to a computer system and input a signal for requesting a specific command from the computer system.

Among the various input devices, recently, a touch input means such as a touch screen that can minimize and simplify a user device by implementing an input means and an output function together is generally used.

A touch input means may sense contact with a touch region by a contact means such as a user's body part or touch pen and may be classified into a resistive type, a capacitive type, an optical type, and an ultrasonic type. The resistive-type touch input means senses a touch by recognizing a pressure applied to a contact point by the touch, the capacitive-type touch input means senses a touch through a change in an electric charge on a contact point caused by the contact of a human body part of a user, and the optical-type touch input means detects a touch position using an infrared light camera and an infrared light lamp.

An initial method for providing a user interface using this touch input means displays a manipulation means such as multiple buttons on a screen and performs a corresponding function based on a position where contact is sensed. Recently, in order to enhance a user's convenience and operability, a method of combining a variety of information such as a contact start position, a contact start time, a contact end position, and a contract end time, recognizing a touch gesture such as tapping, dragging, sliding, and pinching, and executing various user commands according to the touch gesture has also been used. In addition, a method of recognizing multiple touch points in a touch region and executing a user command according to the number of, positions of, combinations of, and distance changes between the touch points has been used.

However, a conventional user interface method using a touch has difficulties in that a user has to be aware of complex patterns or gestures and perform a pattern or gesture corresponding to a command because the user should perform a complex touch gesture or touches several points to draw a complex pattern.

In addition, the conventional user interface method has limitations in providing an instant response because it takes a certain time to perform and then recognize a touch gesture or touch pattern.

DISCLOSURE

Technical Problem

The present invention has been proposed to solve the above-described problems and intends to provide a method and apparatus for providing a user interface using a multi-point touch in which a user may execute various user commands with a one touch operation for two or more points without needing to perform a complex touch gesture such as tapping, dragging, sliding, or pinching or without drawing a predetermined pattern.

In particular, the present invention intends to provide a method and apparatus for providing a user interface using a multi-point touch in which a user may instantly execute various user commands by changing directions of force applied to two or more different points in the touch region.

Technical Solution

One aspect of the present invention provides a method of providing a user interface using a multi-point touch, the method being performed by an apparatus that includes a touch region capable of sensing contact and the method including: sensing contact with two or more different points in the touch region; when the contact with the two or more points is sensed, detecting directions of force applied to the two or more points while the contact with the two or more points is maintained; and executing a predetermined user command according to a combination of the directions of force detected at the points.

The detecting of the directions of force may include: extracting a contact region with a certain area around each point where the contact is sensed; detecting intensities of the force at multiple sensing points in the contact region; and determining a direction of the force applied to the point based on a distribution of the intensities of the force detected at the multiple sensing points.

The determining of the directions of the force may include determining, as the direction of the force, a direction of a sensing point where a greatest intensity of force is detected with respect to a center of the contact region.

The executing of the predetermined user command may include executing the user command according to a combination of the directions of force, the combination being parallel to a line segment connecting the points within a certain margin of error.

The executing of the predetermined user command may include executing the user command according to a combination of the directions of force, the combination being inclined at a certain angle with respect to a line segment connecting the points.

The executing of the user command may include executing the user command according to a force combination pattern obtained by connecting the directions of force detected at the points in a predetermined order.

The executing of the predetermined user command may include performing one or more of rotation, movement, zooming-in, zooming-out, panning, and tilting of a specific object or screen.

The method may further include detecting one or more of a contact time of the points, intensities of the force at the points, and distances between the points, in which the executing of the predetermined user command includes executing the user command in further consideration of one or more of the contact time of the points, the intensities of the force at the points, and the distances between the points in addition to the combination of the directions of force.

Another aspect of the present invention provides an apparatus for providing a user interface using a multi-point touch, the apparatus including: a touch input unit including a touch region capable of sensing contact and configured to sense one or more of contact with the touch region, a position of the contact, an intensity of force upon the contact, and a direction of the force; and a control unit configured to, when contact with two or more points in the touch region is sensed, check directions of force applied to the two or more points while the contact with the two or more points is fixed and execute a predetermined user command according to a combination of the checked directions of force.

The control unit may include a touch event processing module configured to set a contact region with a certain area around each point where the contact is sensed, compare intensities of force at multiple sensing points located in the contact region and may determine the direction of force applied to the point.

The touch event processing module may determine, as the direction of force, a direction of a sensing point where a greatest intensity of force is detected with respect to a center of the contact region.

The control unit may include a pattern extraction module configured to connect the directions of force detected at the two or more different points in a predetermined order and may check a force combination pattern, and execute the user command according to the checked force combination pattern.

The control unit may further detect one or more of a contact time of the points, intensities of the force at the points, and distances between the points and may execute the user command in further consideration of one or more of the contact time of the points, the intensities of the force at the points, and the distances between the points in addition to the combination of the directions of force.

Advantageous Effects

The method and apparatus for providing a user interface using a multi-point touch according to the present invention have an excellent effect of executing various user commands by sensing contact with two or more points in a touch region, detecting directions of force applied to the points while the contact with the points are maintained without changing positions of the contact, executing a user command according to a combination of the detected directions of force, and thus adjusting only the directions of force applied to the contact points without moving from a user touch at the specific point or drawing a complex pattern.

In particular, by a user performing an action of pinching or stretching while maintaining contact with two different points in a touch region, the present invention can adjust zooming-in or zooming-out of a screen or a specific object displayed on the screen without actually moving positions of the contact or performing a touch gesture according to directions of force applied to the points.

In addition, by a user performing an action of adjusting the directions of force applied to the two points in a direction inclined at a certain angle (e.g., a right angle) with respect to a line segment connecting two points, the present invention can adjust rotation/tilting/panning of a screen or a specific object displayed on the screen without actually moving positions of the contact or performing a touch gesture.

In addition, by executing a user command according to a combination of direction of force applied to three or more fixed contact points, the present invention can also more effectively execute various user commands including rotation, tilting, panning, zooming-in, and zooming-out.

Furthermore, the present invention can enable more minute and quick manipulation and response by shortening the time it takes to recognize a touch gesture or touch pattern when user interfacing is performed.

DESCRIPTION OF DRAWINGS

FIG. 8 is an exemplary diagram showing a process of detecting directions of force applied to two contact points in a first embodiment of the present invention.

FIG. 9 is a table illustrating a combination of one pair of directions of force and a user command in a first embodiment of the present invention.

FIG. 12 is a mapping table of a combination pattern of directions of force and a user command according to a second embodiment of the present invention.

MODES OF THE INVENTION

Hereinafter, preferred embodiments of the present invention will be described in detail with reference to the accompanying drawings. However, detailed descriptions related to well-known functions or configurations will be omitted in order not to unnecessarily obscure subject matters of the present invention. In addition, it should be noted that like reference numbers denotes like elements throughout the specification and drawings.

A method of providing a user interface using a multi-point touch according to the present invention may be implemented by an apparatus including a touch region that can sense contact by a contact means such as a user's body part (e.g., finger) or touch pen. Any apparatus may be used as the apparatus as long as it includes a touch input means such as a touch screen that can sense a touch and output a screen at the same time or a touch pad that can sense a touch operation. For example, an apparatus for providing a user interface using a multi-point touch according to the present invention may be a smartphone, a cell phone, a tablet PC, a laptop, a desktop, or a personal digital assistant (PDA).

Figure 1:
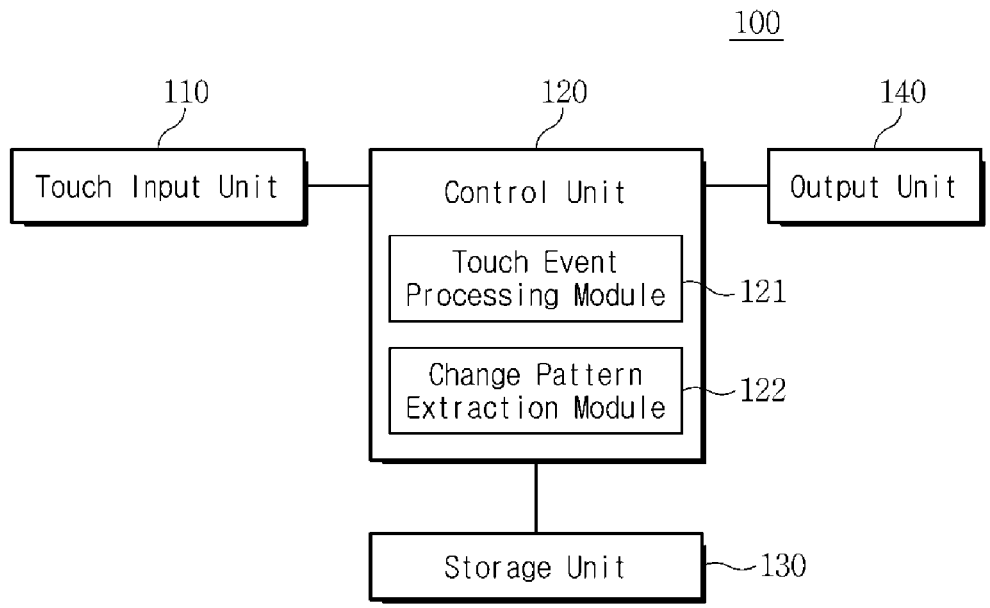
FIG. 1 is a block diagram showing an apparatus for providing a user interface using a multi-point touch according to an embodiment of the present invention.

FIG. 1 is a block diagram showing a configuration of an apparatus for providing a user interface using a multi-point touch according to the present invention. Here, only components associated with the provision of a user interface according to the present invention have been disclosed as components of the apparatus. However, the apparatus may further include a variety of other components depending on a function. Moreover, for convenience of description, it should be understood that components to be described below are represented in units of functions and may be actually implemented by hardware, software, or a combination thereof.

Referring to FIG. 1, an apparatus 100 for providing a user interface using a multi-point touch according to the present invention may be configured to include a touch input unit 110, a control unit 120, a storage unit 130, and an output unit 140.

The touch input unit 110 is configured to include a touch region that can sense contact and sense a variety of information associated with a contact operation to the touch region. Specifically, the touch input unit 110 may sense one or more of contact, a position of the contact, an intensity of force when the contact is applied, and a direction of the force. The touch input unit 110 may be implemented as either a touch pad or a touch screen and also sense a variety of information associated with the contact operation in one or more of a resistive scheme, a capacitive scheme, an optical scheme, and an ultrasonic scheme. In particular, the touch input unit 110 according to the present invention may sense simultaneous contact with two or more different points in the touch region and detect one or more of positions of the contact with the points, intensities of force applied to the points, and directions of the force. For reference, the simultaneous contact in the present invention denotes that contact is applied to different points within a certain margin of error. That is, the touch input unit 110 may sense simultaneous contact with two or more different points in the touch region and detect one or more of positions of the contact with the points, intensities of force upon the contact, and directions of the force.

In addition, information corresponding to one or more of contact with two or more points in the touch region, positions of the contact, intensities of force when the contact is applied, and directions of the force that are detected by the touch input unit 110 is delivered to the control unit 120.

The control unit 120 is a device that performs user interface processing using a multi-point touch according to the present invention, and may recognize a touch-type user input and perform control such that a function or service is provided corresponding to the user input. In particular, when simultaneous contact with two or more different points in the touch region is sensed through the touch input unit 110, the control unit 120 performs control such that a predetermined user command is executed according to a combination of directions of force applied to the points. Specifically, the control unit 120 checks a combination of directions of force applied to the two or more simultaneous contact points within a certain margin of error on the basis of sensing information input from the touch input unit 110 and executes a user command according to the checked combination of directions of force.

In particular, in a first embodiment of the present invention, the control unit 120 may execute the user command according to a combination of directions of force applied to two points when the two points are touched. In this case, the combination of directions of force may include a combination of two directions of force parallel to a line segment connecting the two points and a combination of two directions of force inclined at a certain angle from the line segment connecting the two points. Examples of the combination of two directions of force parallel to the line segment connecting the two points include a case in which the two directions of the force are directed toward each other and a case in which the two directions of the force are directed away from each other. The two cases may occur when a user performs an action of pinching or stretching two fingers without moving the positions while maintaining the contact with the two points. The combination of two directions of force inclined at a certain angle from the line segment connecting the two points includes a case in which the two directions of the force are directed away from each other perpendicularly to the line segment connecting the two points. The case may occur when a user performs an action of twisting two fingers without moving the positions while maintaining the contact with the two points. Furthermore, a user command mapped for each combination of directions of force applied to the two points may include one or more of rotation, movement, panning, tilting, zooming-in, and zooming-out of a screen or a specific object output to the screen.

In this case, the control unit 120 may perform the user command in further consideration of other information such as intensities of force, a contact time, and a distance between the two contact points in addition to a combination of one pair of directions of force. In this case, the other information may be used to adjust limits (e.g., a rotation angle, a rotation speed, a moving distance, an enlargement/reduction ratio) of the user command. In this case, the control unit 120 may execute more various user commands or execute a user command more precisely.

Moreover, in a second embodiment of the present invention, the control unit 120 may execute the user command according to a combination of directions of force applied to three or more points.

In this case, the control unit 120 may execute the user command in further consideration of position information regarding the three or more simultaneous contact points, in addition to the combination of directions of force applied to the three or more points. In addition, the control unit 120 may extract a force combination pattern through the directions of the force applied to the three or more points or a combination of positions of the three or more points and directions of the force applied to the three or more points. The force combination pattern is information used to extract an operation to be executed by a user coming in contact with three or more points and specifically may indicate any of a rotation operation, a closing operation, and an opening operation and one or more of limits (a rotation angle, a zoom in/out factor, or the like) of the operation. In particular, when the user command is executed, the present invention enables 3-dimensional control of operations by combining positions of three points and directions of force detected at the three points.

Furthermore, in the above-described processing, when the touch input unit 110 cannot detect a direction of force, the control unit 120 may include a touch event processing module for determining the direction of force based on information that is input from the touch input unit 110.

The touch event processing module 121 sets a contact region with a certain area around the point where the contact is sensed in the touch region, compares intensities of force detected at multiple sensing points included in the contact region, and determines a direction of force applied to the point. In particular, according to the present invention, the touch event processing module 121 detects respective directions of force applied to two or more points when simultaneous contact is applied to the two or more points. More specifically, the touch region of the touch input unit 110 typically includes multiple sensing points that are arranged at certain distances and configured to sense contact information. The touch event processing module 121 may determines the direction of force applied to the contact region according to a distribution of intensities of force detected at one or more sensing points included in the contact region. For example, when the intensity of force detected at the left side of the contact region is greater, the direction of force is determined to be left. When the intensity of force detected at the right side of the contact region is greater, the direction of force is determined to be right. In addition, the touch event processing module 121 may determine, as the direction of force, a direction of a sensing point where a greatest intensity of force is detected with respect to the center of the contact region.

In addition, the control unit 120 may further include a pattern extraction module 122 to extract a combination pattern of directions of force applied to the two or more simultaneous contact points.

The pattern extraction module 122 may arrange directions of force applied to two or more points, which are detected through the touch event processing module 121, in a predetermined order to extract the force combination pattern. In this case, one or both of a contact time and a contact position, and so on may be further considered in order to extract the combination pattern of directions of force.

The storage unit 130 is configured to store programs and data for operations of the apparatus 100. In particular, the storage unit 130 may store a program for processing a touch event executed by the control unit 120 and a program for executing a user interface using a multi-point touch according to the present invention and also may further store a setting table obtained by mapping a combination of directions of force applied to two or more contact points to a user command corresponding to the combination.

The control unit 120 may perform execution based on programs and data stored in the storage unit 130 to provide a user interface according to the present invention.

Finally, the output unit 140 is configured to output a user interface screen according to a control of the control unit 120. For example, the output unit 140 may be formed using various types of display panels such as liquid crystal display (LCD) or an organic light emitted diode (OLED). In addition, the output unit 140 may be implemented as a structure including a display panel and a touch panel, for example, a touch screen according to the fabricated form. When a display device is formed in the form of a touch screen, the output unit 140 and the touch input unit 110 may be implemented as one body.

An operation of an apparatus 100 for providing a user interface according to the present invention may be described with reference to a first embodiment and a second embodiment that are different from each other.

Figure 2:
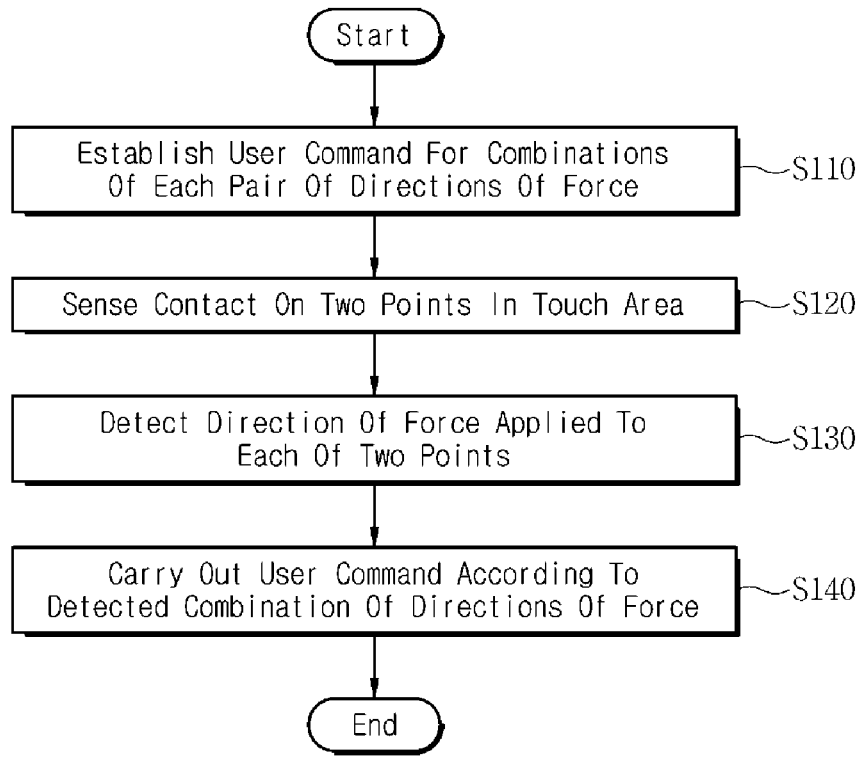
FIG. 2 is a flowchart showing a method of providing a user interface using a multi-point touch according to a first embodiment of the present invention.

FIG. 2 is a flowchart showing a method of providing a user interface using a multi-point touch according to a first embodiment of the present invention. The first embodiment is a two-point touch scheme in which contact with two points occurs simultaneously.

Referring to FIG. 2, in step S110, the apparatus 100 for providing a user interface using a multi-point touch according to the first embodiment of the present invention may map and set a user command that instructs a different function to be performed for each combination of one pair of detectable directions of force. For this, combinations of one pair of directions of force that may be detected by the apparatus 100 are predetermined, and a user command may be selected and set corresponding to each of the combinations of one pair of directions of force. Step S110 may be performed according to a user's selection and may be predetermined in the apparatus 100 as a default operation during a production or distribution stage, irrespective of the user's selection. That is, step S110 may be omitted when the user command is predetermined in the apparatus 100 according to the pattern in which the direction of force changes.

Next, in step S120, the apparatus 100 may sense simultaneous contact with two different points in the touch region through the touch input unit 110. The simultaneous contact denotes that contact with two points simultaneously occurs within a certain margin of error. Here, the contact with two points in the touch region may be sensed through one of a resistive scheme, a capacitive scheme, an optical scheme, and an ultrasonic scheme. In addition, step S120 may be understood as a process in which the control unit 120 checks whether to sense a touch through a touch input unit 110 that is implemented as a touch screen or a touch pad that senses contact through one of the resistive scheme, the capacitive scheme, the optical scheme, and the ultrasonic scheme. Here, the contact point may be one point of a region where an object or a screen to be manipulated by a user is displayed within a touch region provided by the touch input unit 110 or one point of a region that is predetermined as a region for a user's manipulation according to the direction of force within the touch region.

As such, in step S130, when contact with two points in the touch region is sensed, the control unit 120 of the apparatus 100 according to the present invention detects a direction of force applied to each of the points while the contact with the two points is maintained. Here, the direction of force denotes the direction of force applied to a touch plane of a specific point of the touch region as the contact is applied to the point. The direction of force is different from a direction of touch in which a contact point is changed in a touch gesture such as dragging or sliding. Typically, the touch direction denotes a direction from an initial contact position to a contact position after a certain time or to a final contact position, in which a sensed contact position varies with time. However, in the direction of force sensed in step S130, a position value of a contact point where a touch has occurred is not changed, and a direction in which a force is applied varies with the position. The direction of force may be represented in a form that extends radially around the point where contact has occurred and may be represented by an angle value within the range of 0 to 360 degrees or east/west and/or north/south, or front/rear and/or left/right with respect to a predetermined reference axis. Moreover, in step S130, the direction of force may be repeatedly detected at predetermined sampling intervals while the contact with the point is fixed.

When the directions of force applied to the two points where the contact has occurred are detected, in step S140, the control unit 120 of the apparatus 100 according to the present invention executes a predetermined user command according to a combination of the detected directions of force. Here, the executed user command instructs a predetermined operation to be performed for a screen or a specific object output to a user interface screen. For example, the user command may include one or more of rotation, movement, zooming-in, zooming-out, panning, and tilting of the specific object or screen.

As described above, the user may execute various user commands by changing the directions of force applied to the two different points without needing to perform a touch gesture such as dragging or sliding or without changing or moving the position of the contact while the user is in contact with the two points simultaneously.

In addition, as described above, the control unit 120 may perform the user command in further consideration of other information such as intensities of force, a contact time, and a distance between the two contact points in addition to a combination of one pair of directions of force. In this case, the other information may be used to adjust limits (e.g., a rotation angle, a rotation speed, a moving distance, an enlargement/reduction ratio) of the user command. In this case, the control unit 120 may execute more various user commands or execute a user command more precisely.

Figure 3:
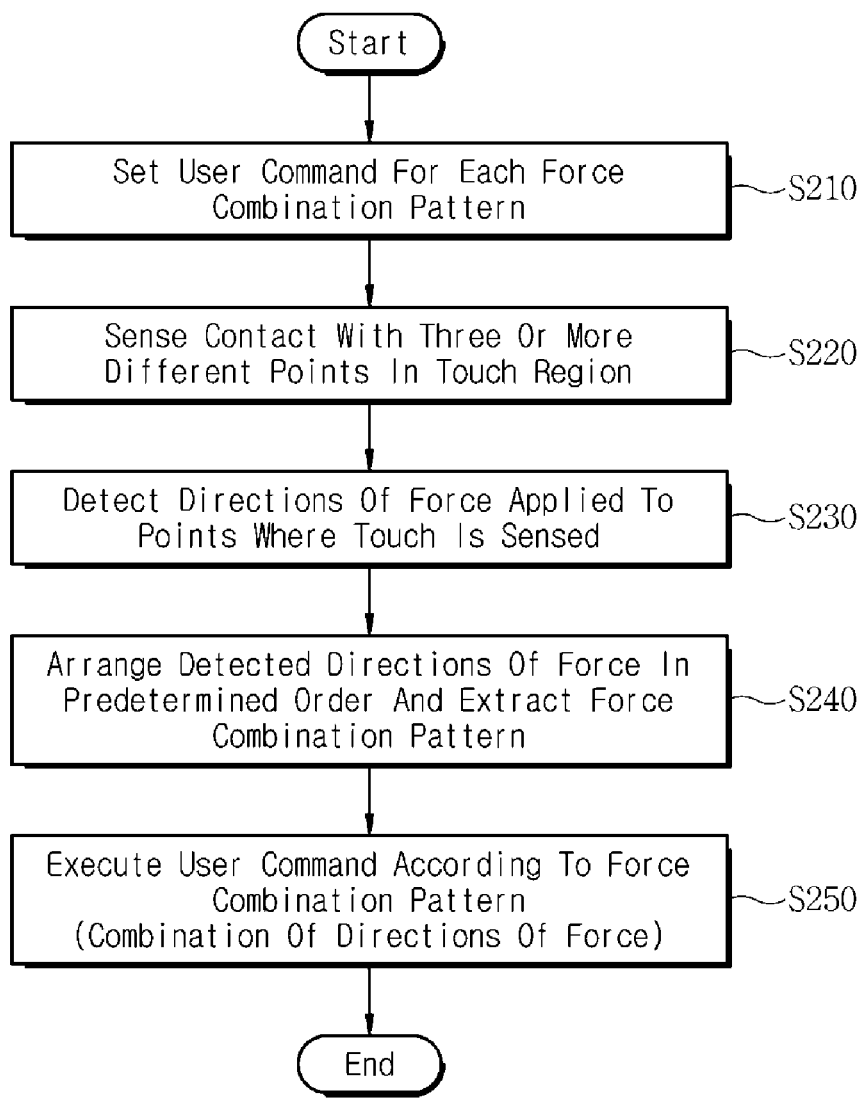
FIG. 3 is a flowchart showing a method of providing a user interface using a multi-point touch according to a second embodiment of the present invention.

Next, FIG. 3 is a flowchart showing a method of providing a user interface using a multi-point touch according to a second embodiment of the present invention. The second embodiment is accomplished by a scheme in which contact with three or more points occurs simultaneously.

Referring to FIG. 3, in step S210, an apparatus 100 for providing a user interface using a multi-point touch according to the present invention may set combination patterns of three or more detectable directions of force and may map and set a user command that instructs a different function to be performed for each of the combination patterns. Step S210 may be performed according to a user's selection and may be predetermined in the apparatus 100 as a default operation during a production or distribution stage, irrespective of the user's selection. That is, step S210 may be omitted when the user command is predetermined in the apparatus 100 according to the combination pattern of directions of force.

Next, in step S220, the apparatus 100 senses contact with the three or more points in the touch region through the touch input unit 110. Here, the contact in the touch region may be sensed through one of a resistive scheme, a capacitive scheme, an optical scheme, and an ultrasonic scheme. In addition, step S220 may be understood as a process of checking whether to sense a touch through a touch input unit 110 that is implemented as a touch screen or a touch pad that senses contact through one of the resistive scheme, the capacitive scheme, the optical scheme, and the ultrasonic scheme. Here, the contact point may be a point predetermined as a region where an object or a screen to be manipulated by a user is displayed within a touch region provided by the touch input unit 110 or a region for a user's manipulation according to the direction of force within the touch region.

As such, when contact with three or more points in the touch region is sensed simultaneously, in step S230, the control unit 120 of the apparatus 100 according to the present invention detects the directions of force applied to three or more points while the contact with the points in the touch region is maintained. Here, each of the directions of force denotes the direction of force applied to a touch plane of a specific point of the touch region as the contact is applied to the point. The direction of force is different from the direction of touch in which a contact point is changed in a touch gesture such as dragging or sliding. Typically, the touch direction denotes a direction from an initial contact position to a contact position after a certain time or to a final contact position, in which a sensed contact position varies with time. However, in the direction of force sensed in step S230, a position value of a contact point where a touch has occurred is not changed. The direction of force may be represented in a form that extends radially around the point where contact has occurred and may be represented by an angle value within the range of 0 to 360 degrees or east/west and/or north/south, or front/rear and/or left/right with respect to a predetermined reference axis. Moreover, the direction of force in step S230 may be repeatedly detected at predetermined sampling intervals while the contact with the points is fixed.

Upon detecting the directions of force applied to the points where the contact has occurred, in step S240, the control unit 120 of the apparatus 100 according to the present invention extracts a combination pattern of directions of force detected at the three or more points. Step S240 may be performed by the pattern extraction module 122 of the control unit 120. Specifically, the pattern extraction module 122 may arrange directions of force detected at the three or more simultaneous contact points in a predetermined order and connect the arranged directions to extract the combination pattern of the directions of force. In addition, the pattern extraction module 122 may extract the combination pattern in further combination of position information regarding the three or more points, in addition to the direction of force. That is, the extraction may be accomplished by arranging the directions of force detected at the three or more points at respective positions where the directions are detected and then connecting the arranged directions of force in a predetermined order.

As such, when the combination pattern of the directions of force applied to the contact points is extracted, in S250, the control unit 120 of the apparatus 100 according to the present invention executes a predetermined user command according to the detected combination of directions of force (combination pattern). Here, the executed user command instructs a predetermined operation to be performed for a screen or a specific object output to a user interface screen. For example, the user command may include one or more of rotation, movement, zooming-in, zooming-out, panning, and tilting of the specific object or screen. In this case, a direction, angle, and distance of the rotation, movement, zooming-in, zooming-out, panning, and tilting may be adjusted in a combination of positions of the three or more contact points and directions of force applied to the three or more contact points. In this case, the rotation, movement, zooming-in, zooming-out, panning, and tilting may be implemented in a three-dimensional (3D) space.

In addition, the present invention may execute the user command in further consideration of other information such as intensities of force, a distance between the contact points, and a contact time, in addition to the combination pattern of the directions of force.

As described above, the user may execute various user commands by changing the directions of force applied to the points through an action of performing a specific operation without needing to perform a touch gesture such as dragging or sliding or without moving the contact position while the user is in contact with the three or more points in the touch region.

Furthermore, in steps S130 and S230 of the methods of providing a user interface according to the first and second embodiments, the direction of force applied to the contact point may be detected in various manners. For example, the detection may be performed through a sensor that may detect the direction of force applied to the contact point according to the touch operation. When the touch input unit 110 included in the apparatus 100 cannot detect the direction of force, the present invention may determine the direction of force using information detectable by the touch input unit 110.

Figure 4:
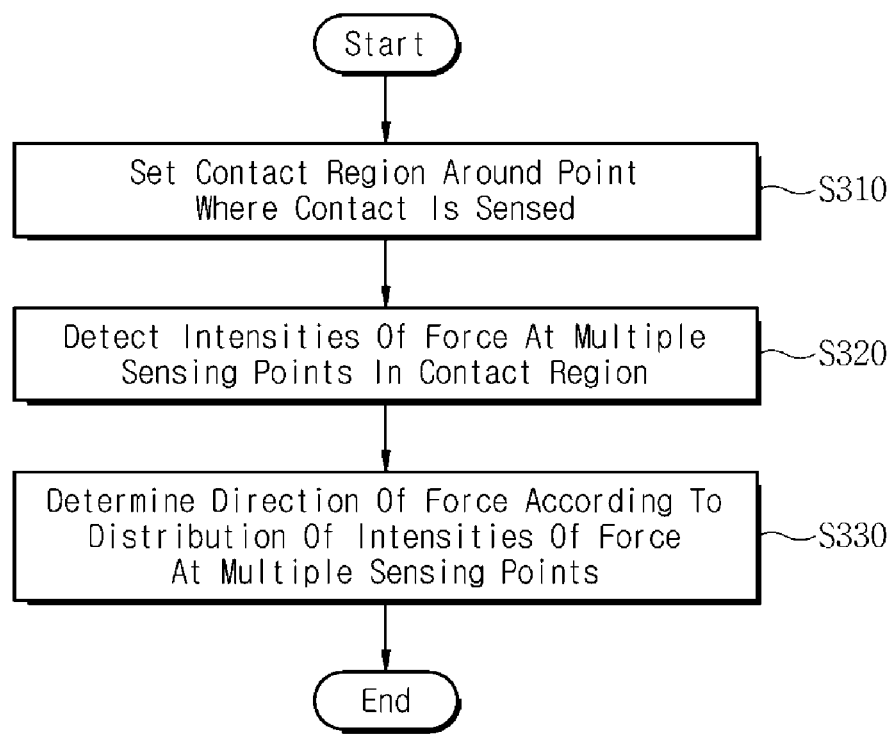
FIG. 4 is a flowchart showing a method of detecting a direction of force in a method of providing a user interface using a multi-point touch according to the present invention.

FIG. 4 is a flowchart showing a method of detecting a direction of force applied to a contact point only using an intensity of force detected by the touch input unit 110. A process to be described below may be applied to detect directions of force applied to two or more simultaneous contact points in the present invention.

Referring to FIG. 4, under a condition that the direction of force applied to the point where the contact is sensed is detected in steps S130 and S230, the control unit 120 of the apparatus 100 according to the present invention sets a contact region with a certain area around the point where the contact is sensed as shown in step S310. Step S310 may also be accomplished by setting a predetermined range of area as the contact region on the basis of the point or also by performing the setting by connecting one or more adjacent sensing points when an actual contact is sensed within the touch region. More specifically, the touch region typically includes multiple points spaced certain distances apart, and touch sensitivity may be changed according to the number of, a distance between, or a unit area of the sensing points. In the present invention, when contact is applied to a touch region by a contact means such as a user's finger or touch pen, the multiple sensing points may be spaced a distance smaller than the finger or touch pen such that the multiple sensing points may sense the contact. In this case, a region obtained by connecting the multiple sensing points that sense the contact applied by the user's finger or contact means within the touch region or a region with a predetermined area on the basis of the multiple sensing points may be set as the contact region.

When the contact region is set, the control unit 120 of the apparatus 100 according to the present invention detects intensities of the force at the multiple sensing points included in the contact region in step S320. Here, the intensities of the force may be represented by pressure levels.

In addition, the control unit 120 of the apparatus 100 according to the present invention may determine the direction of force according to a distribution of the intensities of force that are detected at the multiple sensing points included in the contact region in step S330. More specifically, the determination of the direction of force according to the force intensity distribution includes detecting a direction in which greater force is applied in the contact region as the direction of force. For example, a direction of a sensing point where a greatest intensity of force is detected with respect to the center of the contact region may be determined as the direction of force. Here, the direction of force may be represented as one of front/rear and/or left/right or east/west and/or north/south or may be represented by an angle with respect to a reference axis. In addition, the direction of force may be a direction in a two-dimensional (2D) plane based on the touch region or in a three-dimensional (3D) space further including a downward direction perpendicular to the touch region.

The above-described method of providing a user interface using a multi-point touch according to the present invention may be implemented in the form of software that is readable by various computer means and may be recorded on a computer-readable recording medium. Here, the recording medium may include a program instruction, a data file, a data structure, or a combination thereof. The program instruction recorded on the recording medium may be designed and configured specifically for the present invention or can be publicly known and available to those who are skilled in the field of computer software. Examples of the recording medium include a magnetic medium such as a hard disk, a floppy disk, and a magnetic tape, an optical medium such as a CD-ROM, a DVD, etc., a magneto-optical medium such as a floptical disk, and a hardware device such as a ROM, a RAM, a flash memory, etc. that is specially configured to store and perform the program instruction. Examples of the program instruction include a high-level language code executable by a computer with an interpreter, in addition to a machine language code made by a compiler. The above exemplary hardware device can be configured to operate as one or more software modules in order to perform the operation of the present invention, and vice versa.

That is, the above-described method of providing a user interface may be implemented as a program, stored in the storage unit 130 of the apparatus 100, and then executed by the control unit 120.

The method of providing a user interface using a multi-point touch according to the present invention may be more easily understood by referencing the exemplary diagrams of FIGS. 5 to 14.

Figure 5:
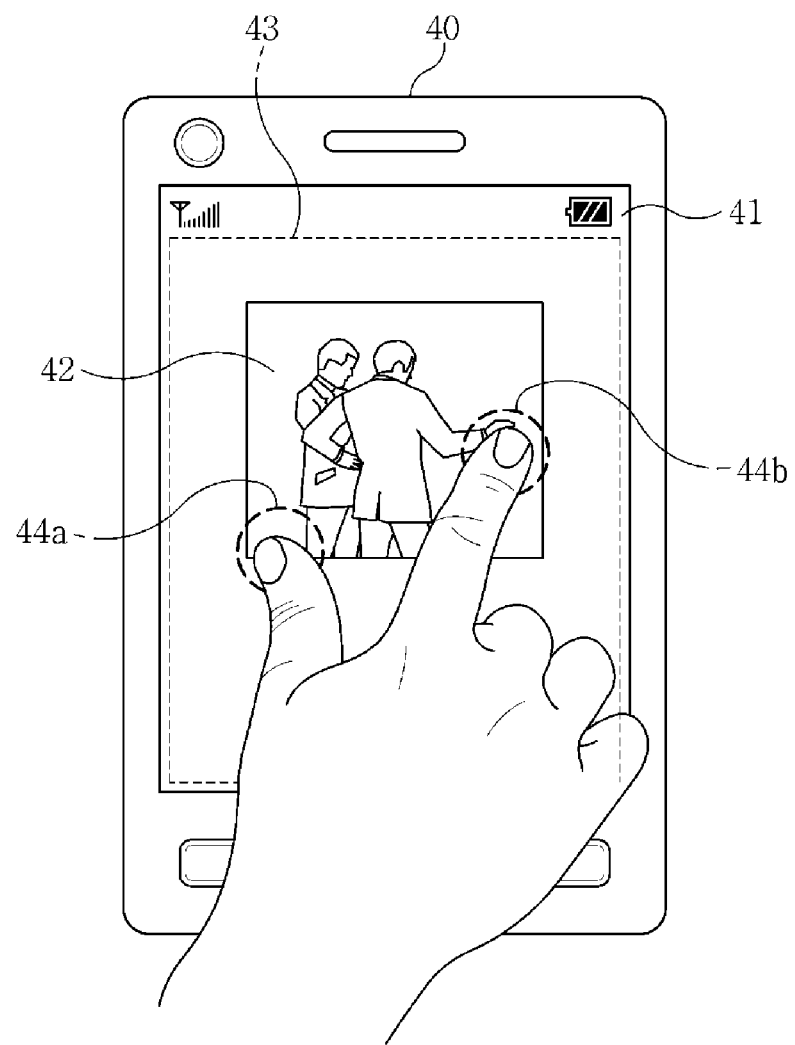
FIG. 5 is an exemplary diagram of a user interface screen using a two-point touch according to a first embodiment of the present invention.

FIG. 5 is an exemplary diagram of a user interface screen according to a first embodiment of the present invention. Here, reference number 40 indicates a device for providing a user interface using a two-point touch according to the present invention, which is a portable terminal device including a touch screen such as a smartphone. Reference number 41 indicates a user interface screen included in the portable terminal device 40. The user interface screen 41 is implemented by the output unit 140 and includes a target to be manipulated by a user, that is, an object 42 to be manipulated by execution of a user command and a touch region 43 for manipulating the object 42.

The touch region 43 may be set as the whole or a portion of the user interface screen 41.

In this case, when a user brings fingers into contact with two points 44a and 44b of the touch region 43, the portable terminal device 40 senses the contact and detects a pair of directions of force $\vec{F1}$ and $\vec{F2}$ applied by the user to the two points. Each direction of force may be detected through a certain sensor included in the touch input unit 110 or a touch event processing module 121 of the control unit 120.

In particular, when the touch input unit 110 cannot detect the direction of force, the touch event processing module 121 may determine the direction of force only using sensing information (e.g., the intensity of force) detected by the touch input unit 110.

Figure 6:
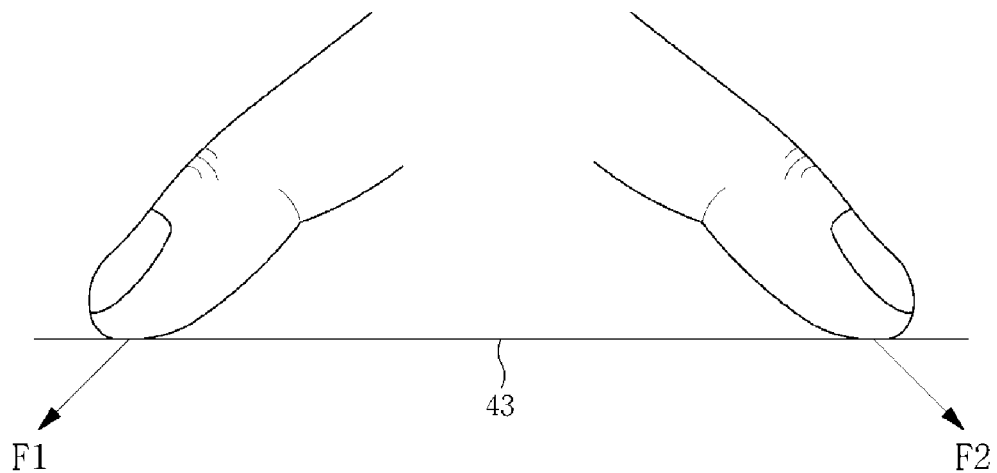
FIG. 6 is a schematic diagram for describing directions of force detected at two contact points in a first embodiment of the present invention.

FIG. 6 is a schematic diagram illustrating a combination of a pair of directions of force detected at two points in the touch region 43. That is, when a user performs an action of stretching the two points in the touch region 43 of FIG. 5 without moving the positions while maintaining the contact with the two points, as shown in FIG. 6, two directions $\vec{F1}$ and $\vec{F2}$ of force in outward directions from the two points may be detected.

Figure 7:
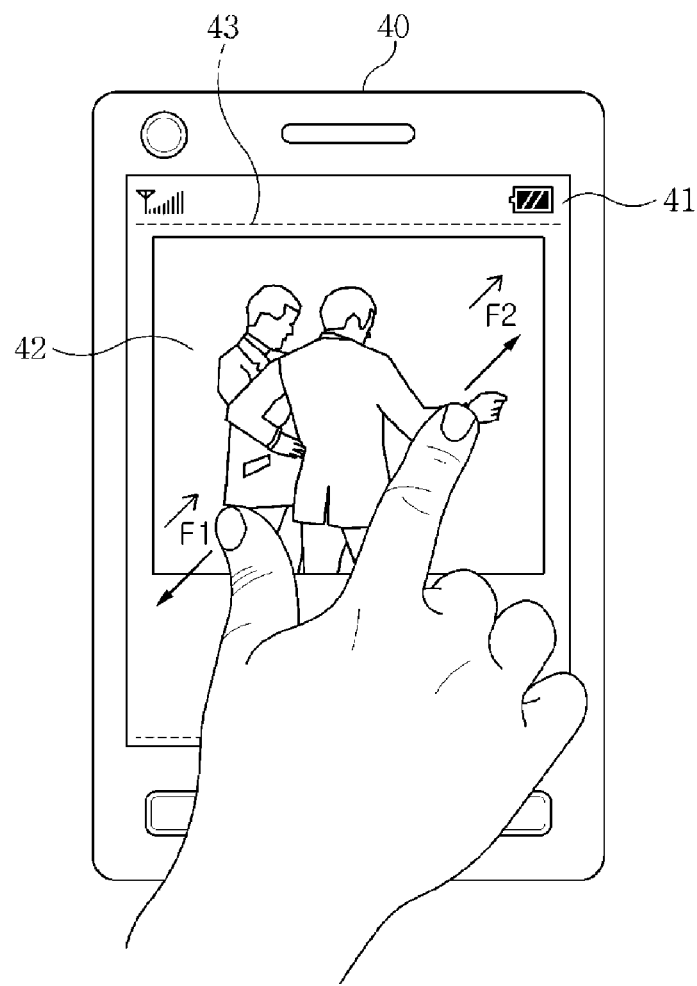
FIG. 7 is a diagram showing an example of a zooming-in operation on a user interface screen using a two-point touch according to a first embodiment of the present invention.

As described above, when a combination of the two directions of force $\vec{F1}$ and $\vec{F2}$ is detected, as shown in FIG. 7, zooming-in may be performed to enlarge the object 42. Here, the enlargement ratio may be determined according to a distance between two contact points, a contact time, and intensities of contact force in the touch region.

FIG. 8 is a schematic diagram showing a process of detecting directions of force using intensities of force detected at two points in a first embodiment of the present invention.

Referring to FIG. 8, when a user comes into contact with two points in the touch region 43, two contact regions 44a and 44b with a certain area are set or extracted around points where a user's fingers are in contact with a surface of the touch region 43. The contact regions 44a and 44b may be set as a predetermined range of area with respect to specific coordinates (e.g., center coordinates) of the two points or may be set by connecting multiple adjacent sensing points that sense the user contact among multiple sensing points included in the touch region 43.

In addition, the intensities of force $F_{a1} \sim F_{a3}$ and $F_{b1} \sim F_{b3}$ detected at the multiple sensing points in the set or extracted contact regions 44a and 44b are checked. The greater intensity of force may be detected at the sensing point of the direction in which a user applies a force in the contact regions 44a and 44b.

Accordingly, the portable terminal device 40 according to the present invention detects, as the directions of force $\vec{F1}$ and $\vec{F2}$ applied to the contact region 44, directions of sensing points having greatest intensities of force among the multiple sensing points with respect to the center points of the contact regions 44a and 44b.

FIG. 9 is a table illustrating a combination of one pair of directions of force applied to the two points and a user command mapped thereto in a first embodiment of the present invention. Here, the combination of directions of force may be displayed as shown in FIG. 8 on the basis of a line segment connecting two points. Here, a user command corresponding thereto may include rotation, movement, panning, tilting, zooming-in, zooming-out, and so on of a screen or a specific object output to the screen.

Referring to an example shown in FIG. 9, when the user performs an action of pinching (picking up) without moving the position while maintaining the contact with the two points in the touch region of the touch input unit 110, the control unit 120 detects two directions of force directed inward toward the two points and thus performs zooming-out of a screen or a specific object displayed on the screen.

As another example, when the user performs an action of stretching without moving the position while maintaining the contact with the two points in the touch region of the touch input unit 110, the control unit 120 detects two directions of force directed outward from the two points and thus performs zooming-in of a screen or a specific object displayed on the screen.

As still another example, when the user performs an action of twisting (rotating) without moving the position while maintaining the contact with the two points, the control unit 120 detects two directions of force that are directed outward perpendicularly from the line segment connecting the two points and thus performs rotation/panning/tilting of a screen or a specific object displayed on the screen. Here, the rotation/panning/tilting directions may be determined based on a direction of one of the two points.

A table for setting a user command as shown in FIG. 9 may be stored in the storage unit 130 and referenced by the control unit 120.

Figure 10:
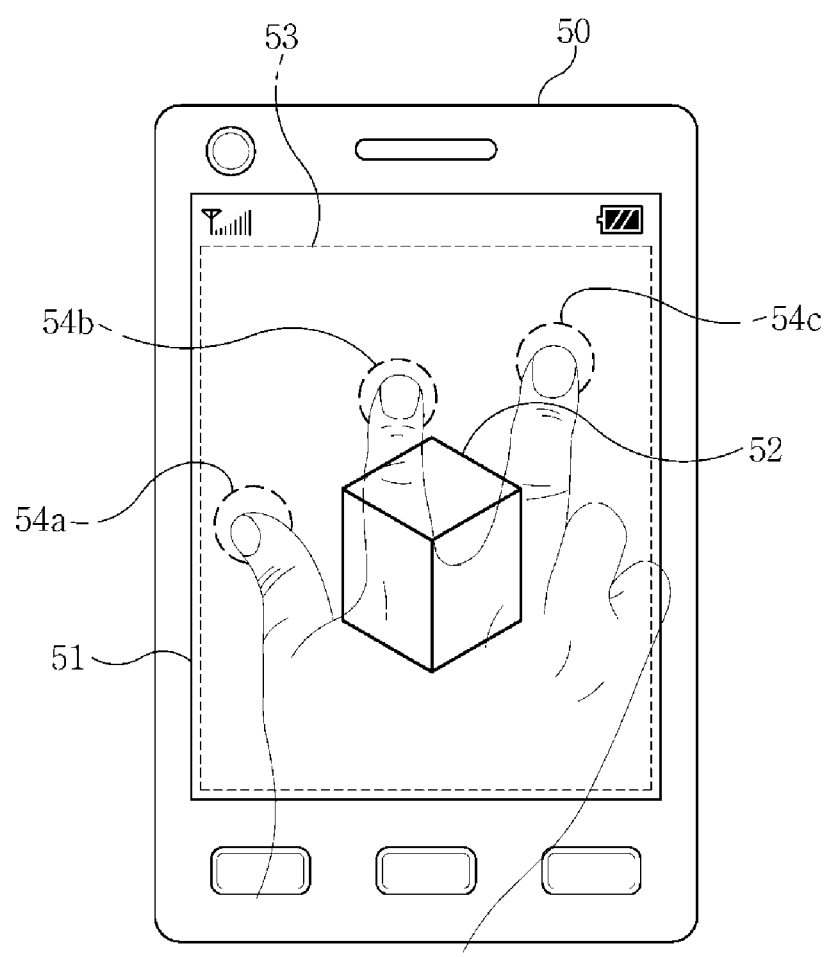
FIG. 10 is an exemplary diagram of a user interface screen using a multi-point touch according to a second embodiment of the present invention.

Next, FIG. 10 is an exemplary diagram of a user interface screen according to a second embodiment of the present invention. Here, it is assumed that a multi-point touch is applied to three points.

Here, reference number 50 indicates a device for providing a user interface using a multi-point touch according to the present invention, which is a portable terminal device including a touch screen such as a smartphone. Reference number 51 indicates a user interface screen included in the portable terminal device 50. The user interface screen 51 includes a target to be manipulated by a user, that is, an object 52 to be manipulated by execution of a user command and a touch region 53 for manipulating the object 52.

The touch region 53 may be set as the whole or a portion of the user interface screen 51 or may be set independently of the user interface screen 51. In addition, the touch region may be set as an area mapped with the object 52 to be manipulated by execution of the user command. In the latter case, the selection of the object to be manipulated by execution of the user command and the execution of the user command according to the direction of force may be simultaneously performed by touching the object 52.

In this case, when a user brings fingers into contact with three points in the touch region 53, the portable terminal device 50 senses the contact and detects positions of the three points and directions of force applied by the user to the three points. Here, references 54a, 54b, and 54c indicate contact regions that are set or detected at three points with which the fingers have been brought in contact. The directions of force applied to the three points may be detected through a certain sensor included in the touch input unit 110 or detected based on the force intensity distribution of the contact regions 54a, 54b, and 54c with which the fingers of the user have been brought in contact.

In particular, when the touch input unit 110 cannot detect the direction of force, the mobile terminal device 40 may determine the direction of force using sensing information (e.g., the intensity of force) detected by the touch input unit 110, through the touch event processing module 121 according to the present invention.

Figure 11:
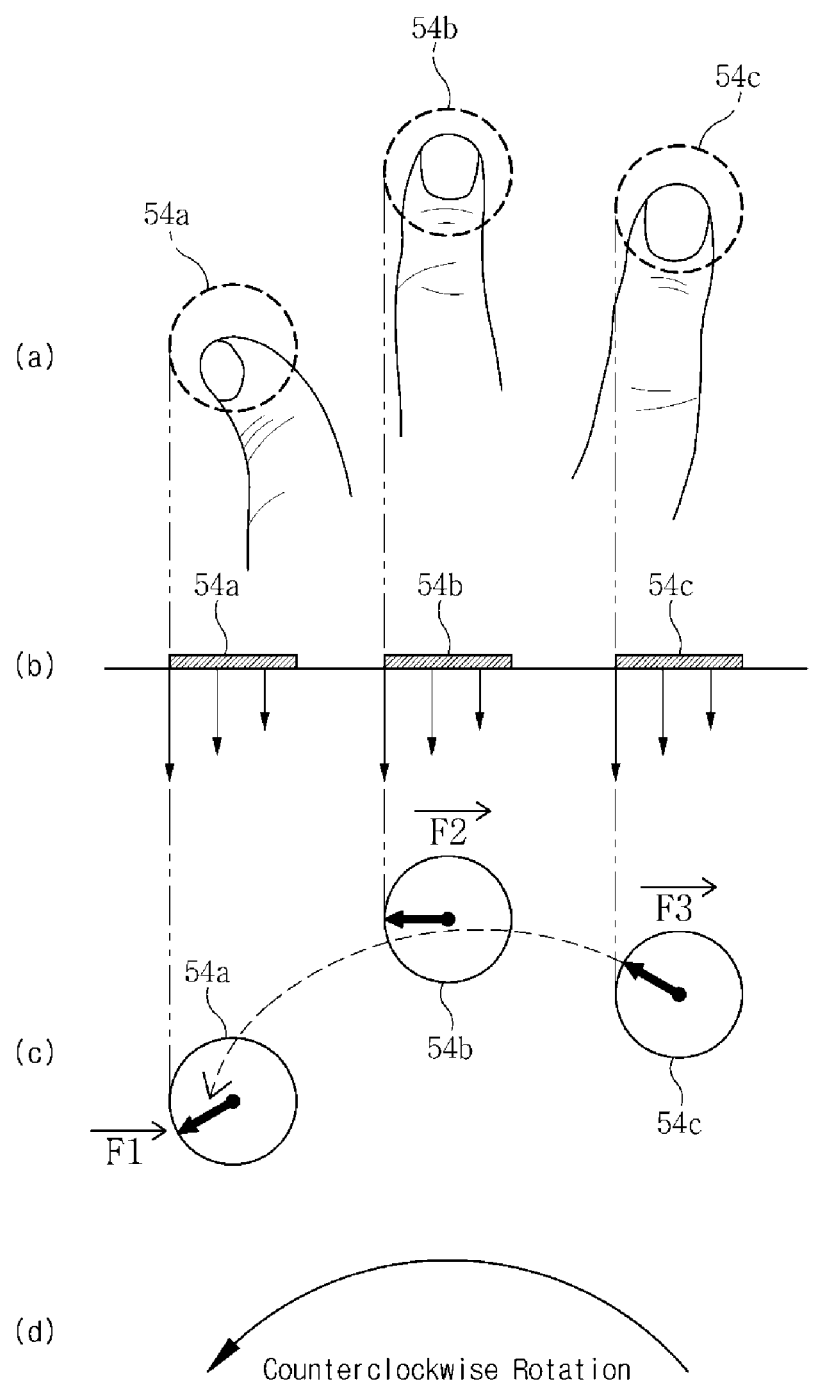
FIG. 11 is a schematic diagram for describing a process of detecting a combination of directions of force applied to a plurality of contact points according to a second embodiment of the present invention.

FIG. 11 is a schematic diagram showing a process of detecting directions of force and a combination pattern thereof in a second embodiment of the present invention.

First, referring to FIG. 11(*a*), when a user contacts three points in the touch region 53, contact regions 54a, 54b, and 54c with a certain area are set or extracted around the points where the user's fingers are brought in contact with the surface of the touch region 53. The contact regions 54a, 54b, and 54c may be set as a predetermined range of area with respect to specific coordinates (e.g., center coordinates) of the points or may be set by connecting multiple adjacent sensing points that sense the user contact among multiple sensing points included in the touch region 53.

As shown in FIG. 11(*b*), the intensities of force detected at multiple sensing points in the contact regions 54a, 54b, and 54c are checked. The intensities of force are detected at the multiple sensing points in the contact regions 54a, 54b, and 54c according to a direction of force applied by the user.

In particular, a greater intensity of force may be detected at a sensing point that is in the direction of force applied by the user.

Furthermore, as shown in FIG. 11(c), the portable terminal device 50 according to the present invention detects, as the directions of force applied to the contact regions 54a, 54b, and 54c, directions of force $\vec{F1}$, $\vec{F2}$, and $\vec{F3}$ of sensing points having greatest intensities of force among the multiple sensing points with respect to the center points of the contact regions 54a, 54b, and 54c.

Finally, a combination pattern, which is a counterclockwise rotation as shown in FIG. 11(d), may be calculated by connecting the directions $\vec{F1}$, $\vec{F2}$, and $\vec{F3}$ of force detected in FIG. 11(c) in a predetermined order. Subsequently, the object 42 may be rotated in a counterclockwise direction according to the combination pattern.

FIG. 12 is a mapping table of a combination pattern of directions of force and a corresponding user command in a method of providing a user interface according to a second embodiment of the present invention.

Referring to FIG. 12, when a user performs an action of coming into contact with three points simultaneously and turning left without moving the contact positions, a combination pattern such as number of FIG. 12 may be detected. In this case, "left rotation" may be performed according to the user command. In this case, a rotation angle can be adjusted based on information such as intensities of force detected at the three points, a contact time, distances between the three points, and positions of the three points. On the contrary, when a user performs an action of coming into contact with three points simultaneously and turning right without moving the contact positions, a combination pattern such as number of FIG. 12 may be detected. In this case, "right rotation" may be performed according to the user command. Likewise, when a user performs an action of coming into contact with three points simultaneously and turning up or down without moving the contact positions, a combination pattern such as number or of FIG. 12 may be detected. In this case, "up or down rotation" may be performed according to the detected combination pattern. In addition, when a user performs an action of coming into contact with three points simultaneously and pinching in a direction directed inward toward the three points or stretching in a direction outward from the three points, a combination pattern such as number or of 12 may be detected to execute the zooming-in or the zooming-out. That is, when a user performs an action of coming into contact with the three points and then stretching, which may intuitively indicate zooming-in, the zooming-in is executed. On the contrary, when a user performs an action of coming into contact with the three points and then pinching, which may intuitively indicate zooming-out, the zooming-out is executed. The force combination patterns and the user commands are merely examples and not limited to those shown in FIG. 12. However, the force combination patterns and the user commands may be applied in various forms.

Figure 13:
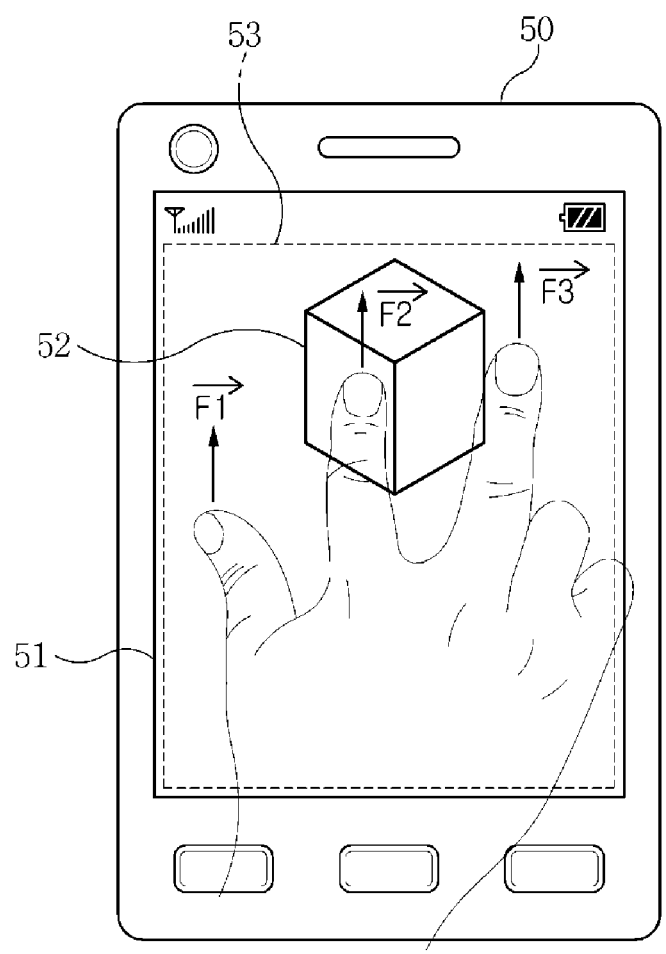
FIGS. 13 and 14 are exemplary diagrams showing an execution status of a user command for each combination pattern of directions of force according to the second embodiment of the present invention.
Figure 14:
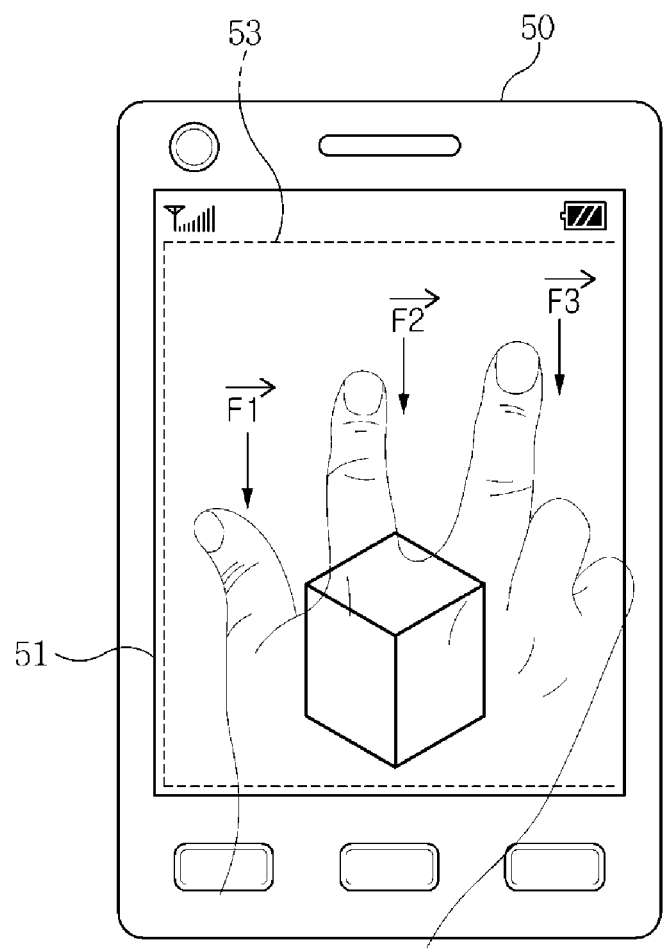

FIGS. 13 and 14 illustrate other examples in the method of providing a user interface according to a second embodiment of the present invention. As shown in FIG. 13, when a user performs an action of pushing up on the screen while maintaining the contact with the contact regions 53a, 53b, and 53c, a combination pattern such as number of FIG. 12 is detected. In this case, an object 52 displayed on the screen is moved up on the screen. On the contrary, as shown in FIG. 14, when a user performs an action of pulling down on the screen while maintaining the contact with the contact regions 53a, 53b, and 53c, a combination pattern such as number of FIG. 12 is detected. In this case, an object 52 displayed on the screen is moved down on the screen.

As described above, when the combination pattern of the directions of force applied to three or more points is used, it is possible to calculate a combination pattern in 2D and 3D spaces according to a method of combining position information regarding the three or more points with directions of force applied to the three or more points, thus enabling a 2D or 3D manipulation using the combination pattern.

The apparatus and method according to various embodiments of the present invention have been described above. However, implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The computer readable medium can be a machine readable storage device, a machine readable storage substrate, a memory device, a composition of matter effecting a machine readable propagated signal, or a combination of one or more of them.

While this specification contains many specifics, these should not be construed as limitations on the scope of what is being claimed or of what may be claimed, but rather as descriptions of features specific to particular embodiments.

Furthermore, even though operations are described in a certain order on the drawings, it should not be understood that the operations should be executed in the certain order or in a sequential order to obtain desired results, or that all the operations should be executed. In some cases, a multitasking and a parallel processing may be beneficial.

Although specific embodiments have been illustrated and described herein, it is obvious to those skilled in the art that many modifications of the present invention may be made without departing from what is intended to be limited solely by the appended claims. While preferred embodiments of the present invention have been described using specific terms, such description is for illustrative purposes only, and it is to be understood that changes and variations may be made without departing from the spirit or scope of the following claims.

INDUSTRIAL APPLICABILITY

The method and apparatus for providing a user interface using a multi-point touch according to the present invention have an excellent effect of executing various user commands by sensing contact with two or more points in a touch region, detecting directions of force applied to the points while the contact with the points are maintained without changing positions of the contact, executing a user command according to the detected directions of force, and thus adjusting only the directions of force applied to the contact points without moving from a user touch at the specific point or drawing a complex pattern.

In particular, the present invention can allow the user to manipulate a portable user device such as smartphone with one hand and thus enhance a user's convenience because the manipulation is enabled by coming into contact with two or more points simultaneously and then adjusting only directions of force.

In addition, the present invention may more effectively manipulate rotation, tilting, panning, zooming-in, zooming-out, and so on by executing a user command according to a change pattern of a direction of force applied to a fixed contact point. For example, when an object is to be rotated, a user may perform a motion of rotating in a desired direction with respect to the fixed contact point and thus change the direction of force to the desired direction, thereby manipulating the rotation of the object.

Furthermore, the present invention enables more minute and quick manipulation and response by using a moving distance or position when user interfacing is performed.

The invention claimed is:

1. A method of providing a user interface using a multi-point touch, the method being performed by an apparatus that includes a touch region capable of sensing contact and the method comprising:
   sensing contact at two or more different points in the touch region;
   when the contact with the two or more points is sensed:
      sensing whether the contact with the two or more different points is maintained and fixed at corresponding two or more positions in the touch region, and
      detecting directions of force applied to the two or more different points; and
   executing a predetermined user command according to a combination of the directions of force detected at the two or more different points when the contact with the two or more different points is maintained and fixed at the corresponding two or more positions in the touch region.

2. The method of claim 1, wherein the detecting of the directions of force comprises:
   extracting a contact region with a certain area around each point where the contact is sensed;
   detecting intensities of the force at multiple sensing points in the contact region; and
   determining a direction of the force applied to the point based on a distribution of the intensities of the force detected at the multiple sensing points.

3. The method of claim 2, wherein the determining of the directions of the force comprises determining, as the direction of the force, a direction of a sensing point where a greatest intensity of force is detected with respect to a center of the contact region.

4. The method of claim 1, wherein the executing of the predetermined user command comprises executing the user command according to a combination of the directions of force, the combination being parallel to a line segment connecting the points within a certain margin of error.

5. The method of claim 1, wherein the executing of the predetermined user command comprises executing the user command according to a combination of two directions of force, the combination being inclined at a certain angle with respect to a line segment connecting the points.

6. The method of claim 1, wherein the executing of the predetermined user command comprises performing one or more of rotation, movement, zooming-in, zooming-out, panning, and tilting of a specific object or screen.

7. The method of claim 1, further comprising detecting one or more of a contact time of the points, intensities of the force at the points, and distances between the points, wherein the executing of the predetermined user command comprises executing the user command in further consideration of one or more of the contact time of the points, the intensities of the force at the points, and the distances between the points in addition to the combination of the directions of force.

8. The method of claim 1, wherein the executing of the user command comprises executing the user command according to a force combination pattern obtained by connecting the directions of force detected at the points in a predetermined order.

9. An apparatus for providing a user interface using a multi-point touch, the apparatus comprising:
   a touch input unit including a touch region capable of sensing contact and configured to sense one or more of contact with the touch region, a position of the contact, an intensity of force upon the contact, and a direction of the force; and
   a control unit configured to, in response to the contact with the two or more points in the touch region being maintained and fixed at corresponding two or more positions in the touch region:
      check directions of force applied to the two or more points, and
      execute a predetermined user command according to a combination of the checked directions of force.

10. The apparatus of claim 9, wherein the control unit comprises a touch event processing module configured to set a contact region with a certain area around each point where the contact is sensed, compare intensities of force at multiple sensing points located in the contact region, and determine the direction of force applied to the point.

11. The apparatus of claim 10, wherein the touch event processing module determines, as the direction of force, a direction of a sensing point where a greatest intensity of force is detected with respect to a center of the contact region.

12. The apparatus of claim 9, wherein the control unit,
   comprises a pattern extraction module configured to connect the directions of force detected at the two or more different points in a predetermined order and check a force combination pattern, and
   executes the user command according to the checked force combination pattern.

13. The apparatus of claim 9, wherein the control unit further detects one or more of a contact time of the points, intensities of the force at the points, and distances between the points, and executes the user command in further consideration of one or more of the contact time of the points, the intensities of the force at the points, and the distances between the points in addition to the combination of the directions of force.

14. A method of providing a user interface using a multi-point touch, the method being performed by an apparatus that includes a touch region capable of sensing contact and the method comprising:
   sensing fixed contact at each point of two or more different points in the touch region;
   detecting a direction of force applied to each point of the two or more points of the fixed contact; and
   executing a predetermined user command according to a combination of the direction of force applied at each point of the two or more points when the fixed contact is stationary, wherein the combination is parallel to a line or a plane as defined by the two or more points or inclined the line or the plane at an angle with respect to the line or the plane.

\* \* \* \* \*